(12) United States Patent
Copenhaver

(10) Patent No.: US 9,808,695 B1
(45) Date of Patent: *Nov. 7, 2017

(54) STEER ROPING PRACTICE APPARATUS WITH IMPROVED LEG GAIT

(71) Applicant: Alan R. Copenhaver, Hinton, IA (US)

(72) Inventor: Alan R. Copenhaver, Hinton, IA (US)

(73) Assignee: Hot Heels, Inc., Hinton, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,525

(22) Filed: Dec. 29, 2016

Related U.S. Application Data

(63) Continuation of application No. 14/749,040, filed on Jun. 24, 2015, now Pat. No. 9,533,209.

(51) Int. Cl.
*A63B 69/00* (2006.01)
*A01K 15/02* (2006.01)

(52) U.S. Cl.
CPC .......... *A63B 69/0068* (2013.01); *A01K 15/02* (2013.01); *A63B 69/00* (2013.01)

(58) Field of Classification Search
CPC ................................................. A63B 69/0068
USPC .......................... 273/359, 366–370; 119/839
See application file for complete search history.

(56) References Cited

U.S. PATENT DOCUMENTS

| 3,066,939 | A | 12/1962 | Sprout |
| 3,776,553 | A | 12/1973 | Kelton |
| 3,802,706 | A | 4/1974 | Hamm |
| 4,266,779 | A | 5/1981 | English |
| 4,364,570 | A | 12/1982 | Hallam |
| 4,451,045 | A | 5/1984 | Fesmire |
| 4,662,642 | A | 5/1987 | Archibald |
| 4,874,179 | A | 10/1989 | Henderson |
| 4,960,076 | A | 10/1990 | Snorgrass |
| 4,981,302 | A | 1/1991 | Narramore |
| 4,995,618 | A | 2/1991 | Panzner |
| 5,009,432 | A | 4/1991 | Richard |

(Continued)

FOREIGN PATENT DOCUMENTS

CA    2187825    4/1998

OTHER PUBLICATIONS

GP Manufacturing, LLC, "Speed Roper & Speed Header" website, product information, Jan. 8, 2007, 10 pages, www.teamroper.com/speed.

*Primary Examiner* — Mark Graham
(74) *Attorney, Agent, or Firm* — Jeffrey A. Proehl; Woods, Fuller, Shultz & Smith PC

(57) ABSTRACT

A mechanical roping steer apparatus for practicing roping of a steer may comprise a support assembly for resting on a ground surface, a rotatable wheel configured to contact the ground surface such that movement of the support assembly across the ground rotates the wheel, and a steer assembly connected to the support assembly. The steer assembly may comprise a frame having a spine structure, a hip structure movably mounted on the frame to move between first and second positions, and a leg structure movably mounted on the hip structure to move between forward and rearward positions, and including at least one leg member. The steer assembly may include an actuation assembly may be configured to move the leg member downwardly toward the ground surface during rearward movement of the leg member and move the leg member upwardly during forward movement of the leg member.

16 Claims, 12 Drawing Sheets

(56) References Cited

U.S. PATENT DOCUMENTS

| | | | |
|---|---|---|---|
| 5,080,373 A | 1/1992 | Jones | |
| 5,568,926 A | 10/1996 | Kaptein | |
| 5,709,386 A | 1/1998 | Nelson | |
| 6,497,411 B1 | 12/2002 | Nelson | |
| 6,736,399 B1 | 5/2004 | Copenhaver | |
| 6,945,534 B1 | 9/2005 | Lindsey | |
| 7,059,605 B1 | 6/2006 | Hughes | |
| 7,293,775 B1 | 11/2007 | Donnelly | |
| 7,430,990 B1 | 10/2008 | Copenhaver | |
| 8,297,980 B2 | 10/2012 | Reynolds | |
| 8,783,689 B1 | 7/2014 | Copenhaver | |
| 9,533,209 B1 * | 1/2017 | Copenhaver | A63B 69/00 |
| 2004/0101811 A1 | 5/2004 | Gipson | |
| 2006/0170163 A1 | 8/2006 | Perkins | |

* cited by examiner

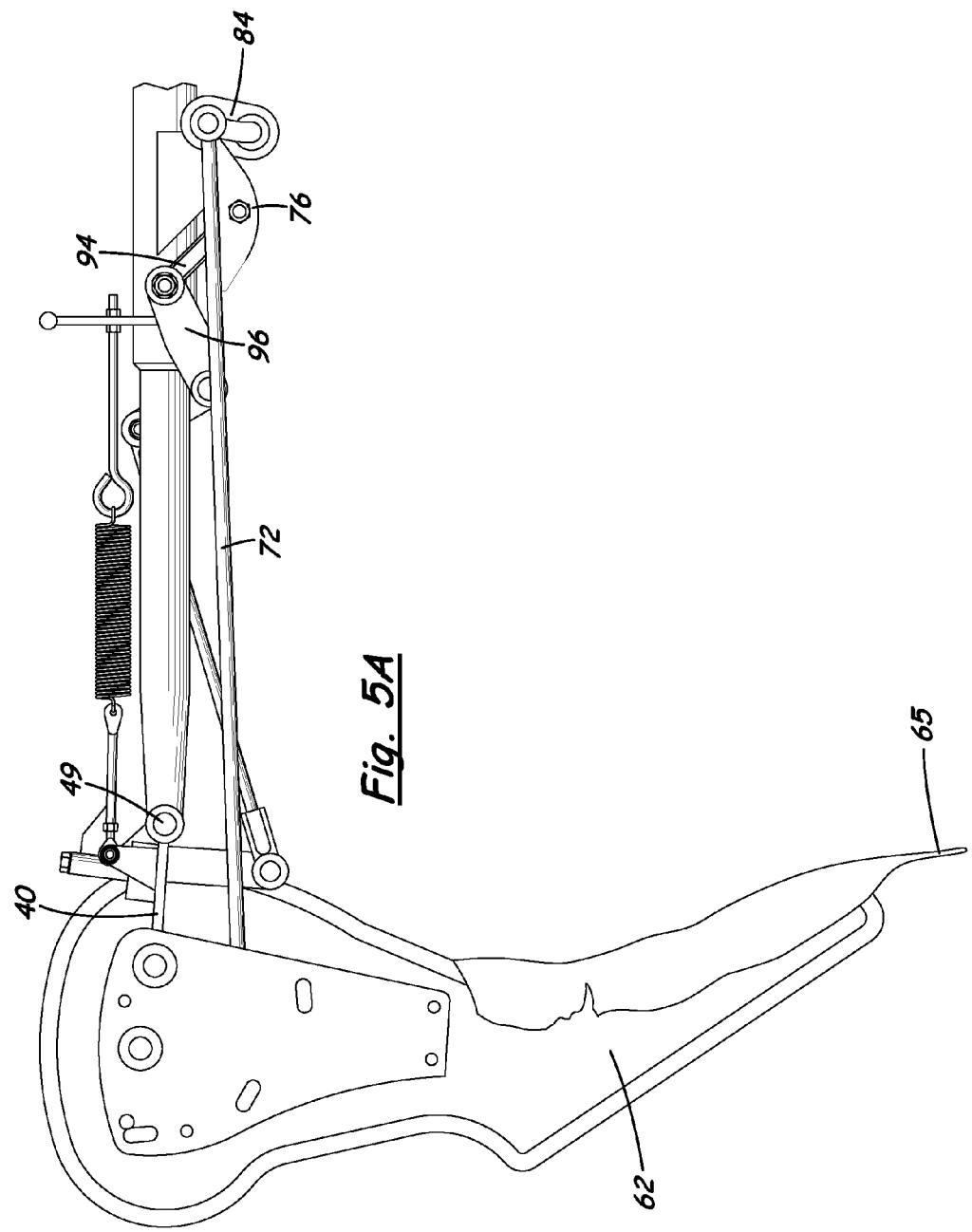

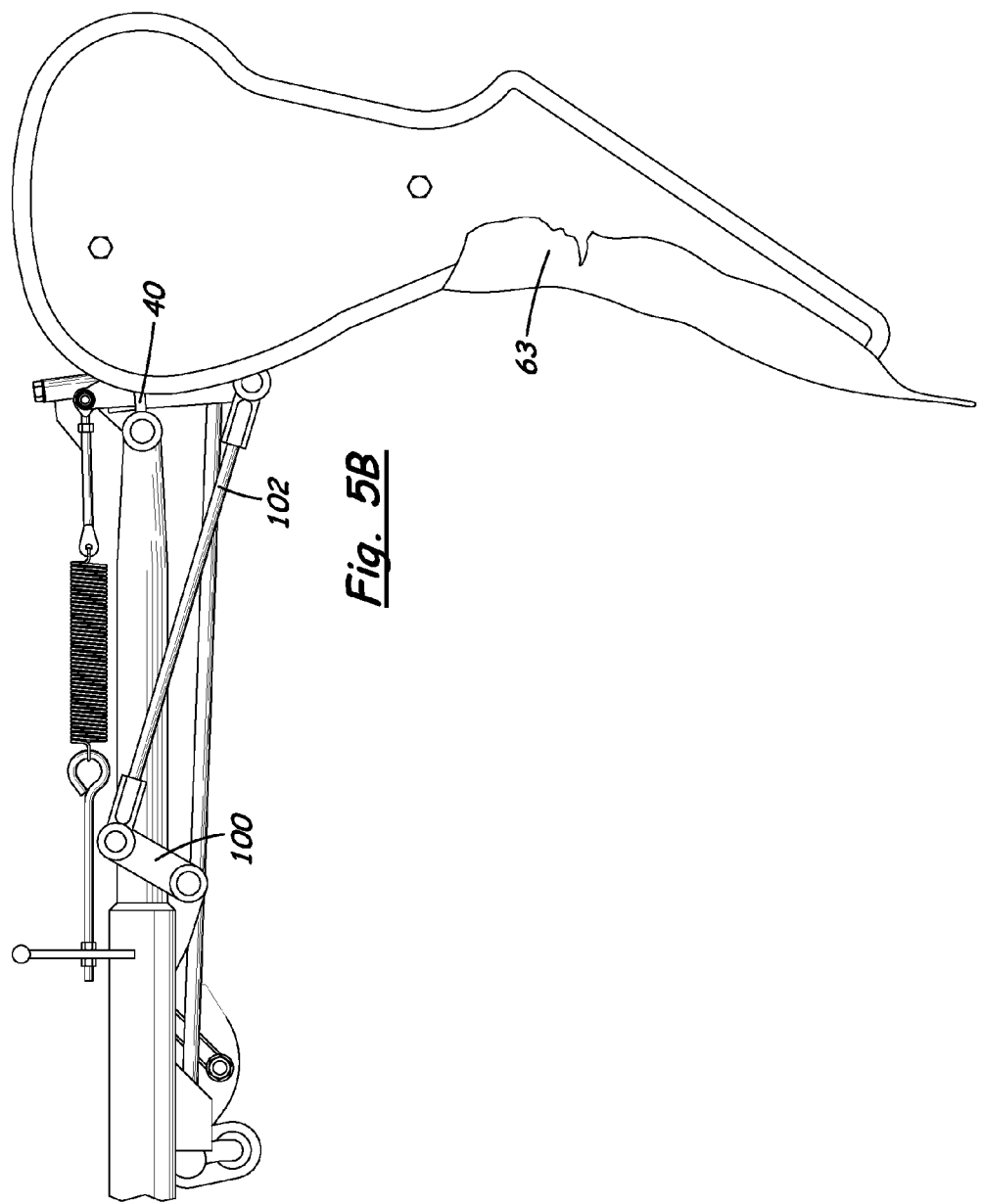

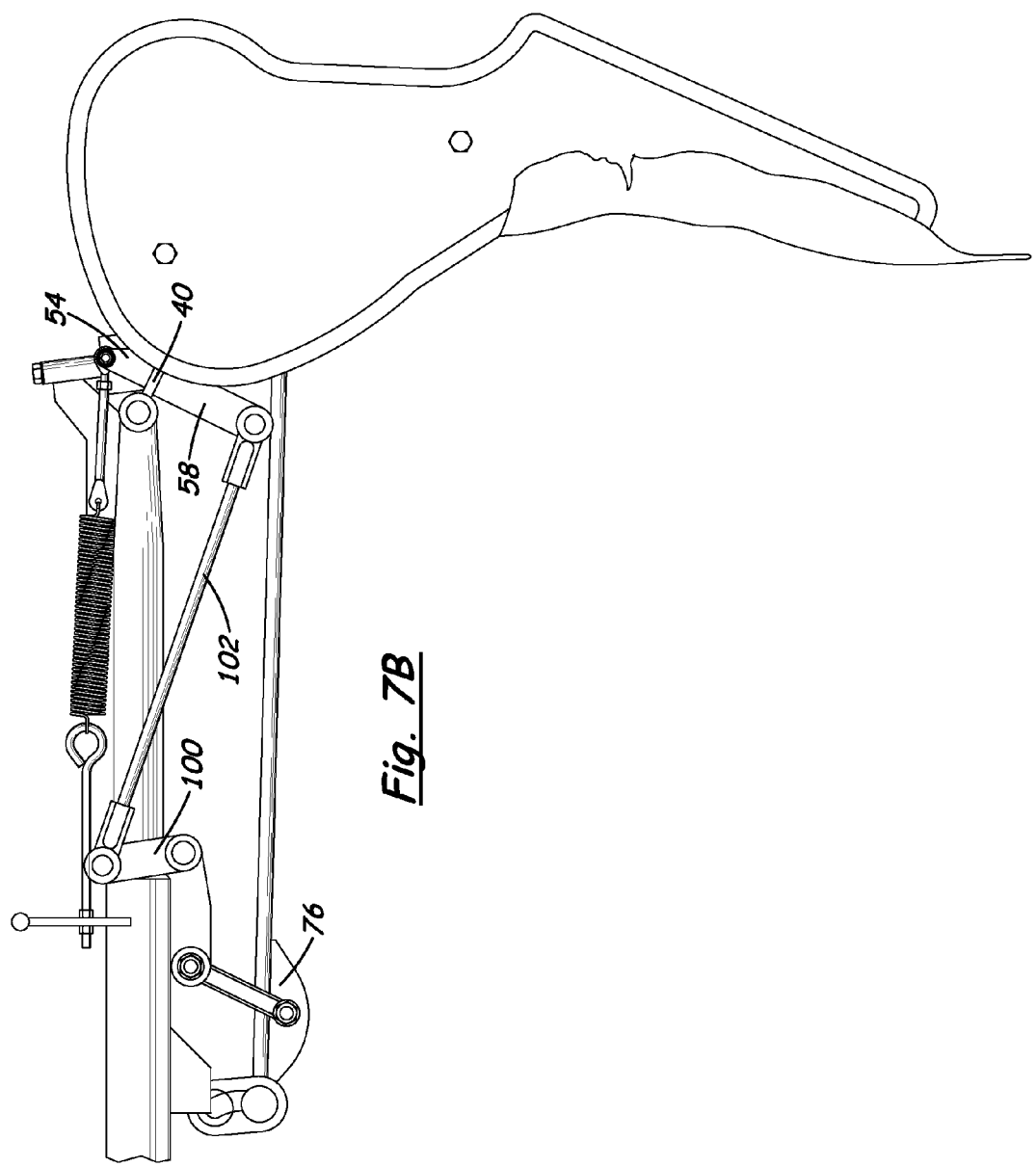

STEER ROPING PRACTICE APPARATUS WITH IMPROVED LEG GAIT

BACKGROUND

Field

The present disclosure relates to roping training apparatus and more particularly pertains to a new steer roping practice apparatus with improved leg gait for more realistic roping training.

Description of the Prior Art

Steer roping practice apparatus are generally known in the art, and highly useful practice apparatus are disclosed in my U.S. Pat. No. 6,736,399, my U.S. Pat. No. 7,430,990 and my U.S. Pat. No. 8,783,689, each of which is hereby incorporated by reference in their respective entireties. While these apparatus have significant advantages, the applicant has recognized improvements that can further enhance the realism of the steer roping simulation provided by such apparatus.

SUMMARY

In one aspect, the present disclosure relates to a mechanical roping steer apparatus for practicing roping of a steer. The apparatus may comprise a support assembly for resting on a ground surface, a rotatable wheel configured to contact the ground surface such that movement of the support assembly across the ground rotates the wheel, and a steer assembly connected to the support assembly. The steer assembly may comprise a frame having a spine structure and a front and a rear. The steer assembly may also have a hip structure movably mounted on the frame to move between a first position and a second position, with the hip structure having a forward end mounted on the spine structure of the frame and a rearward end. The steer assembly may include a leg structure movably mounted on the hip structure to move between a forward position and a rearward position, with the leg structure including at least one leg member extending downwardly with respect to the hip structure. The steer assembly may also have an actuation assembly configured to move the at least one leg member downwardly toward the ground surface during rearward movement of the at least one leg member and move the at least one leg member upwardly during forward movement of the at least one leg member.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 5A is a schematic right side view of the steer assembly, according to an illustrative embodiment, shown with the leg structure at a substantially forward movement portion of the gait movement.

FIG. 5B is a schematic left side view of the steer assembly, according to an illustrative embodiment, shown with the leg structure at the substantially forward movement portion of the gait movement similar to the position of FIG. 5A.

FIG. 7B is a schematic left side view of the steer assembly, according to an illustrative embodiment, shown with the leg structure at the substantially forward movement portion of the gait movement similar to the position of FIG. 7A.

DETAILED DESCRIPTION

Figure 1:
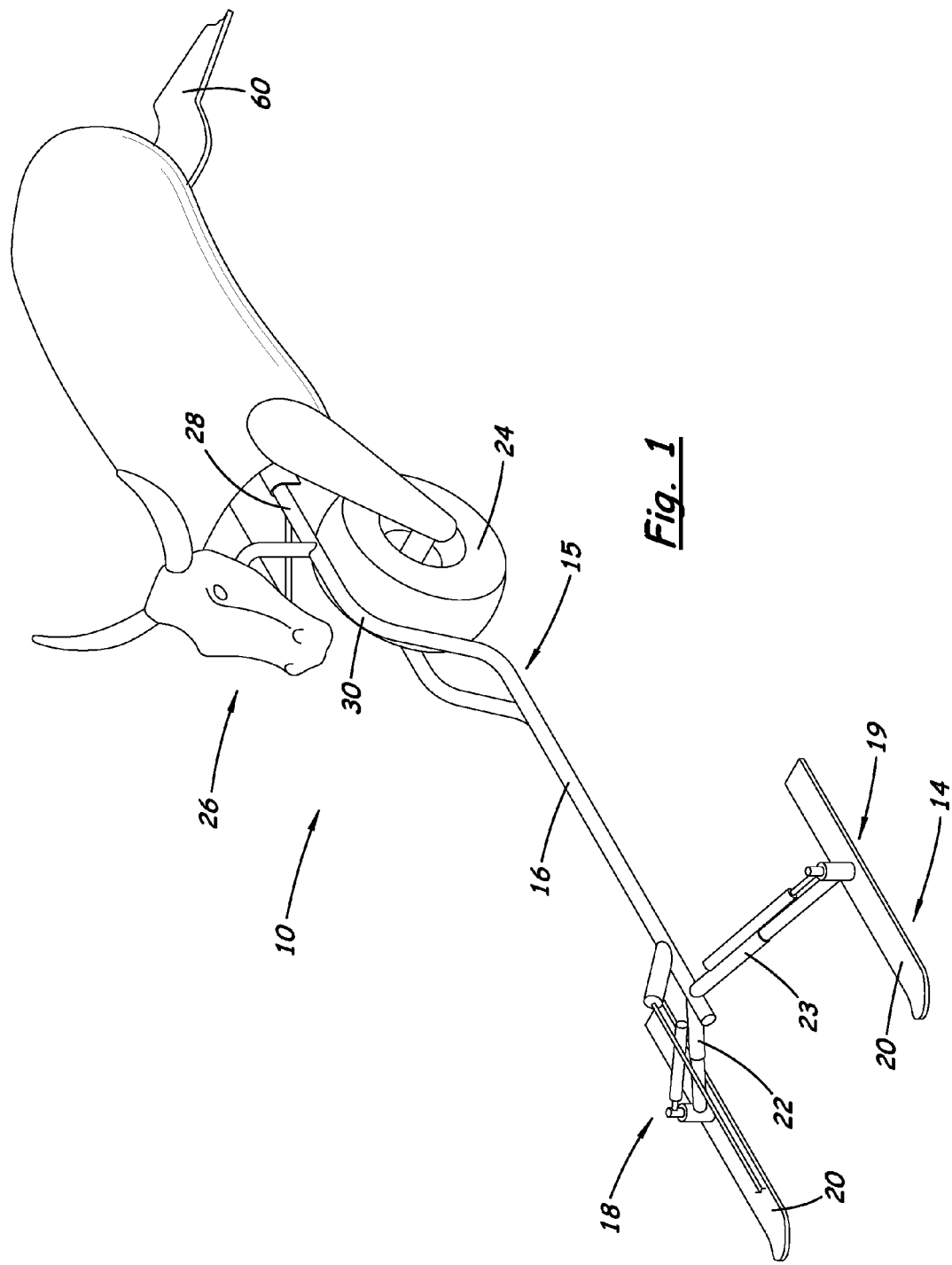
FIG. 1 is a schematic perspective view of a new steer roping practice apparatus with improved leg gait according to the present disclosure.
Figure 2:
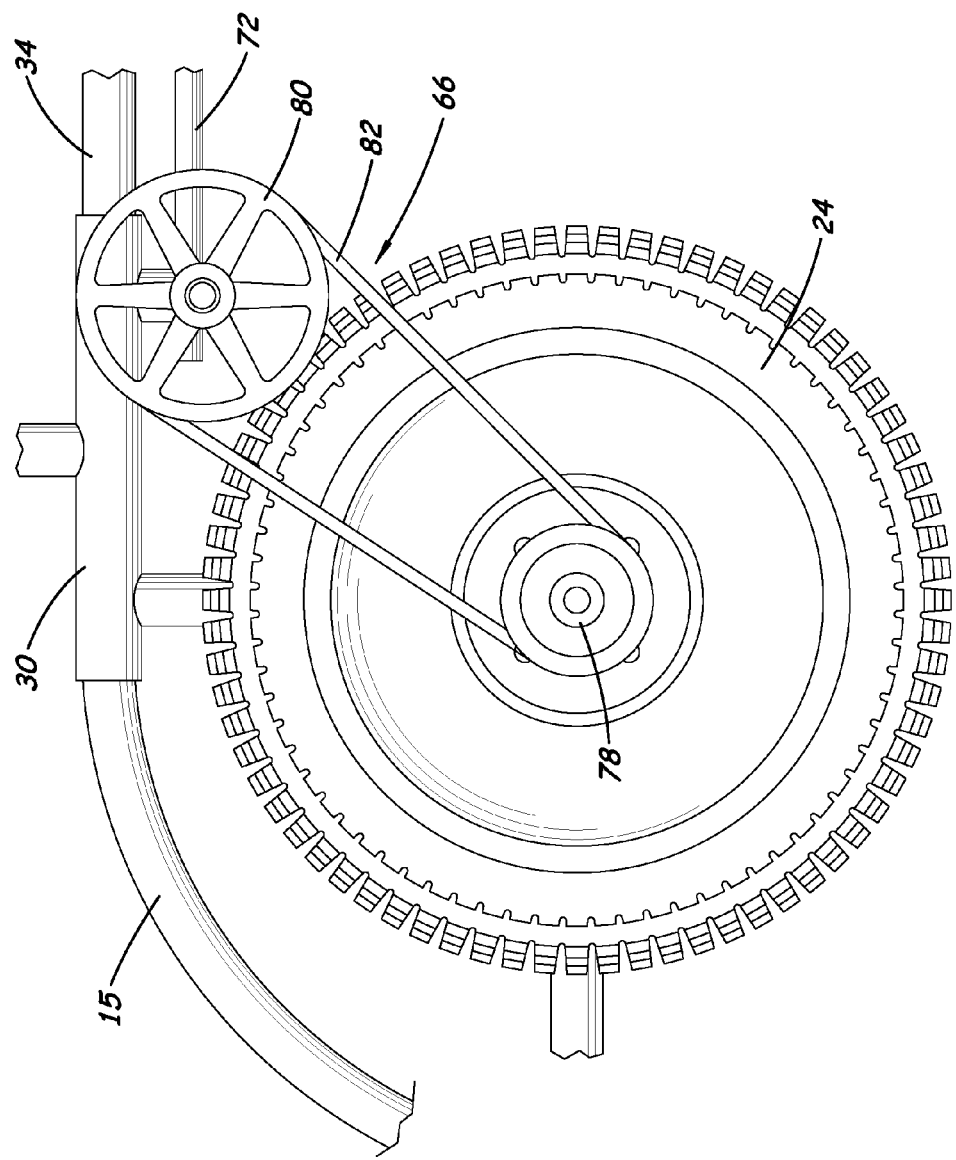
FIG. 2 is a schematic side view of a portion of the support assembly and steer assembly of the practice apparatus, according to an illustrative embodiment, showing a portion of the actuation assembly.
Figure 3:
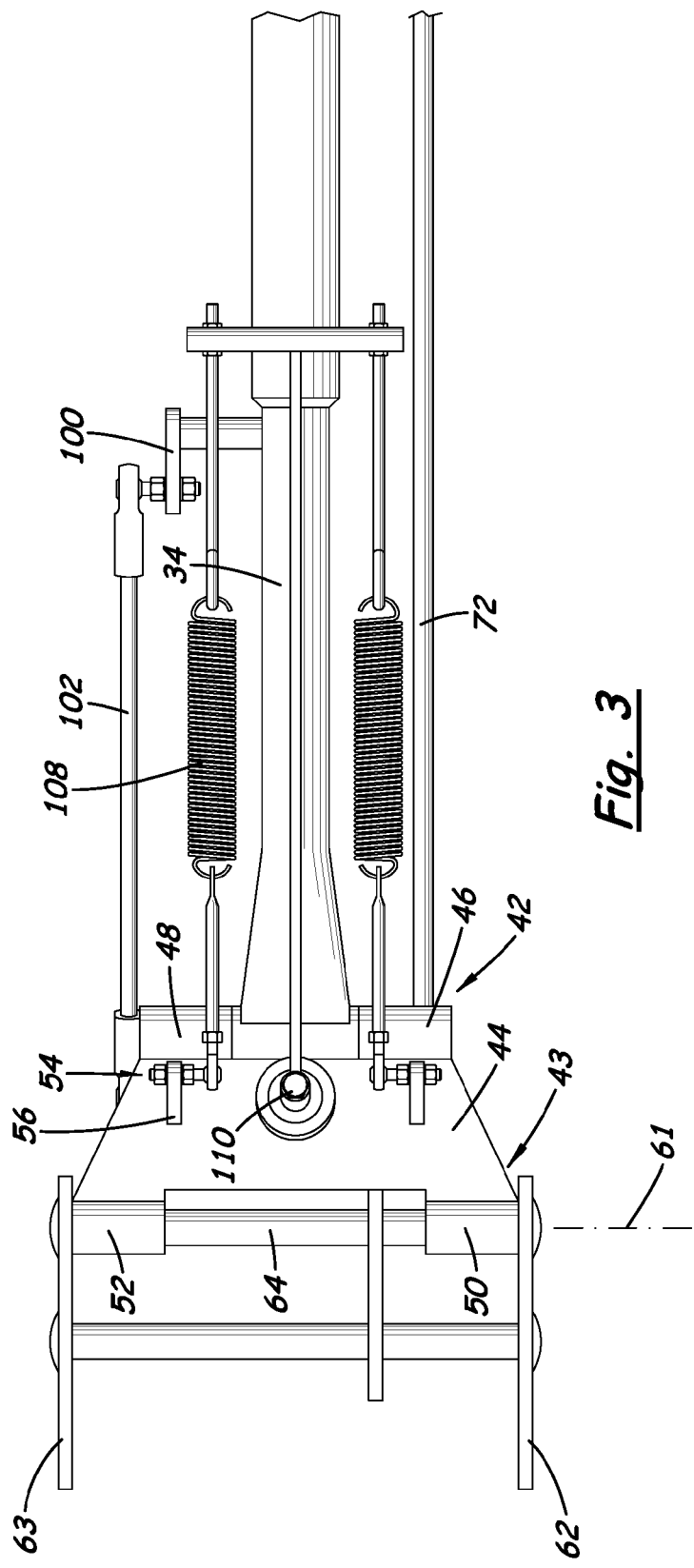
FIG. 3 is a schematic top view of the frame and hip and leg strictures with portions of the actuation assembly of the steer assembly, according to an illustrative embodiment.
Figure 4A:
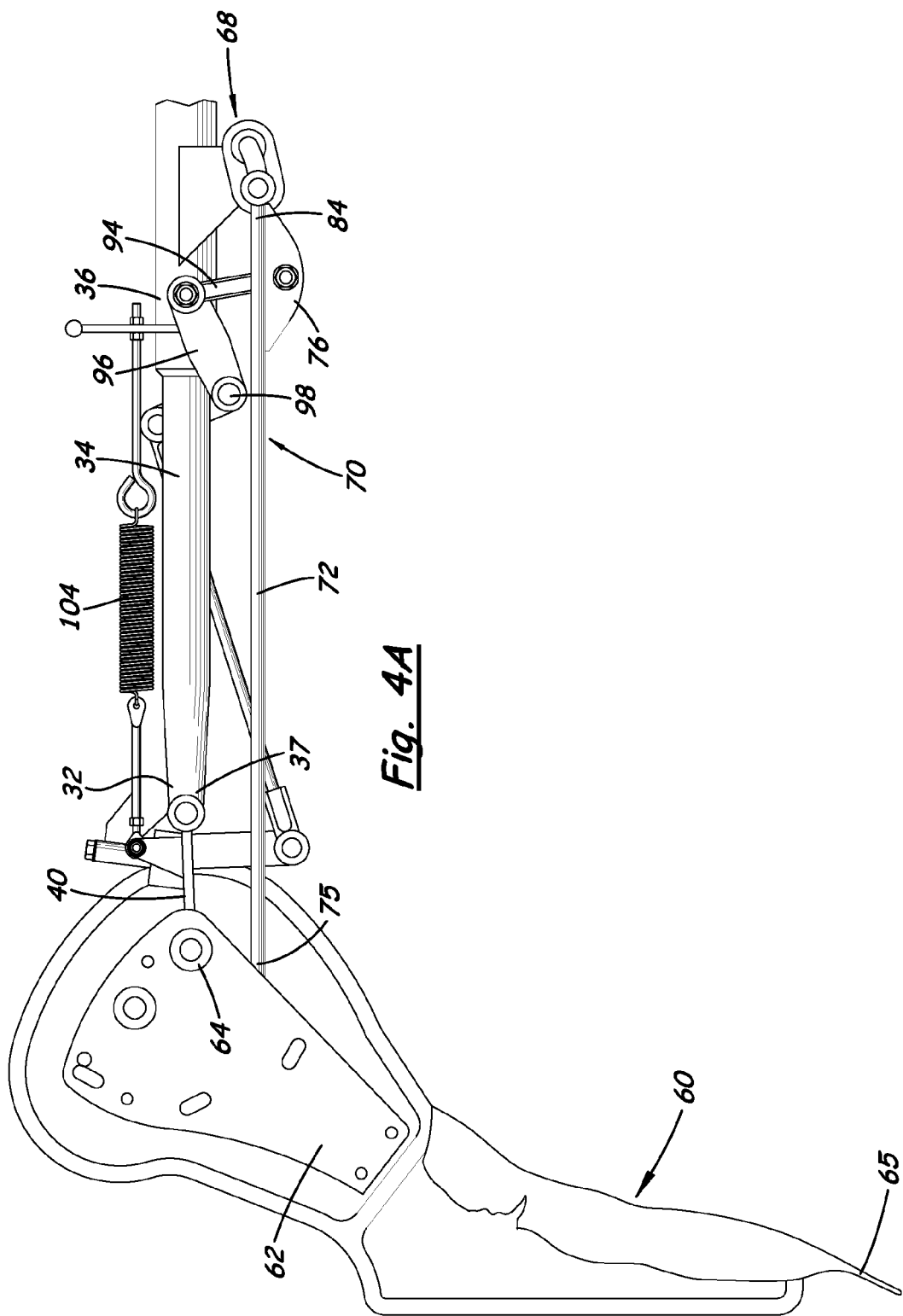
FIG. 4A is a schematic right side view of the steer assembly, according to an illustrative embodiment, shown with the leg structure at a substantially rearwardmost position of the gait movement.
Figure 4B:
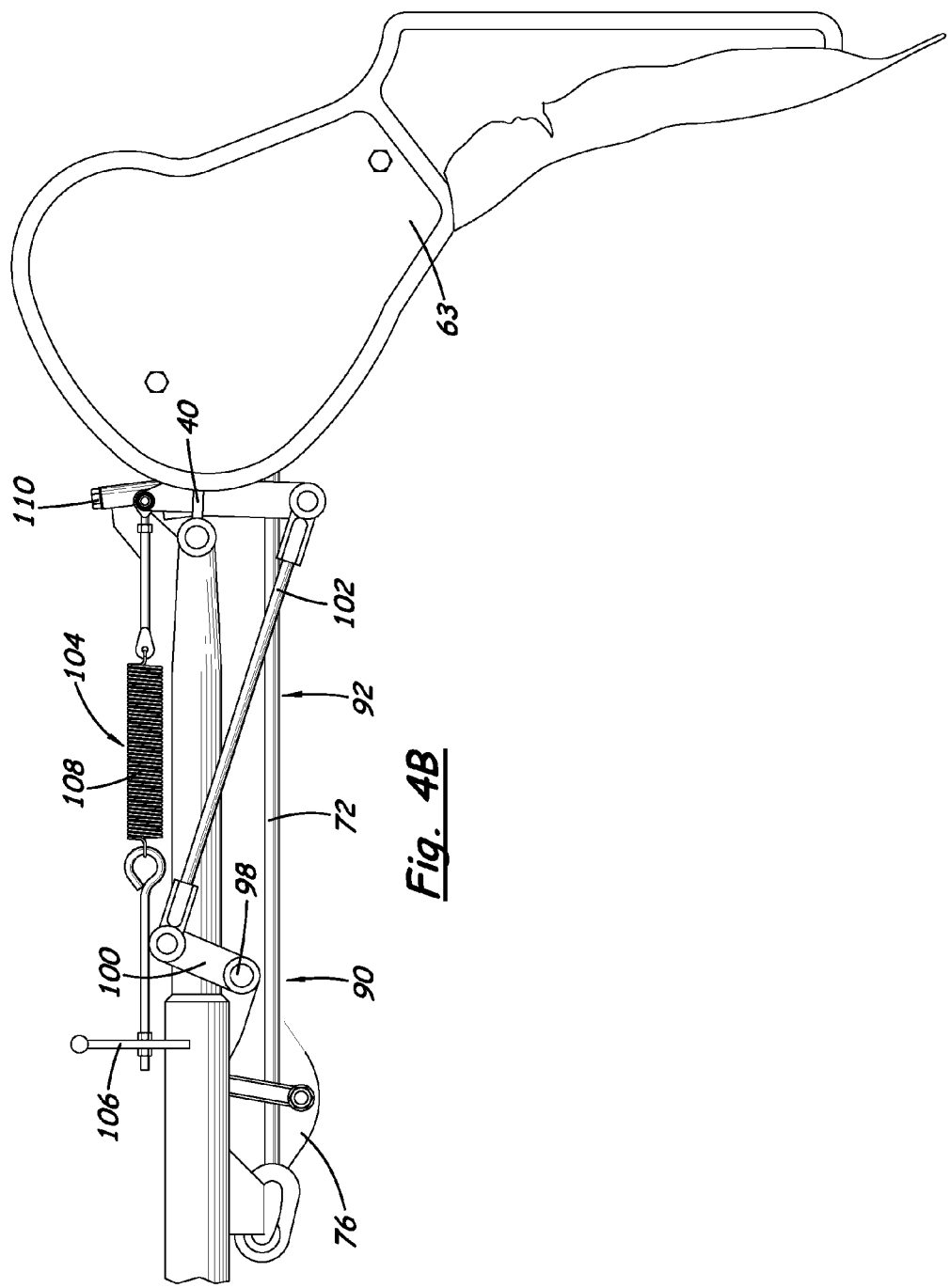
FIG. 4B is a schematic left side view of the steer assembly, according to an illustrative embodiment, shown with the leg structure at the substantially rearwardmost position of the gait movement similar to the position of FIG. 4A.
Figure 6A:
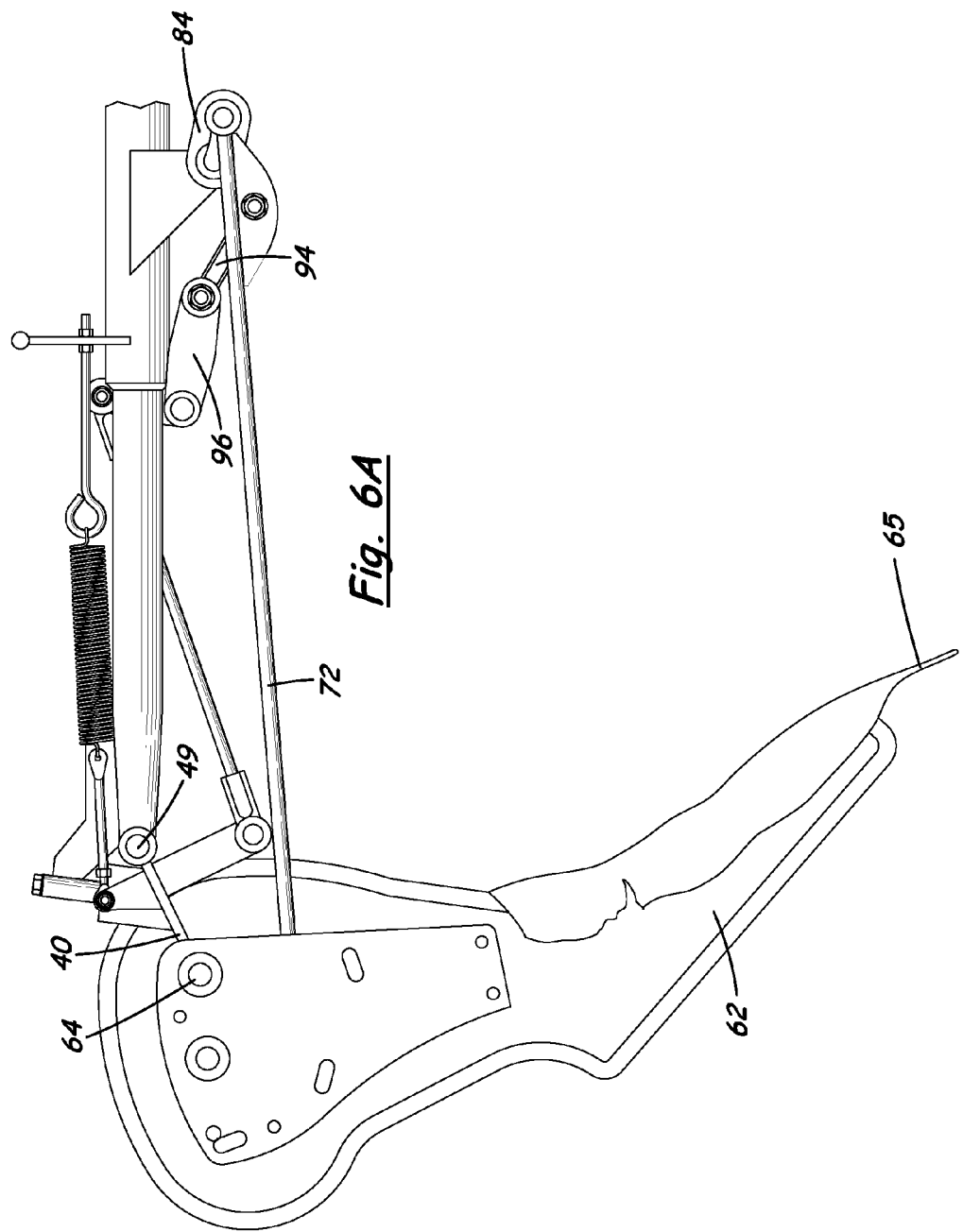
FIG. 6A is a schematic right side view of the steer assembly, according to an illustrative embodiment, shown with the leg structure at a substantially forwardmost position of the gait movement.
Figure 6B:
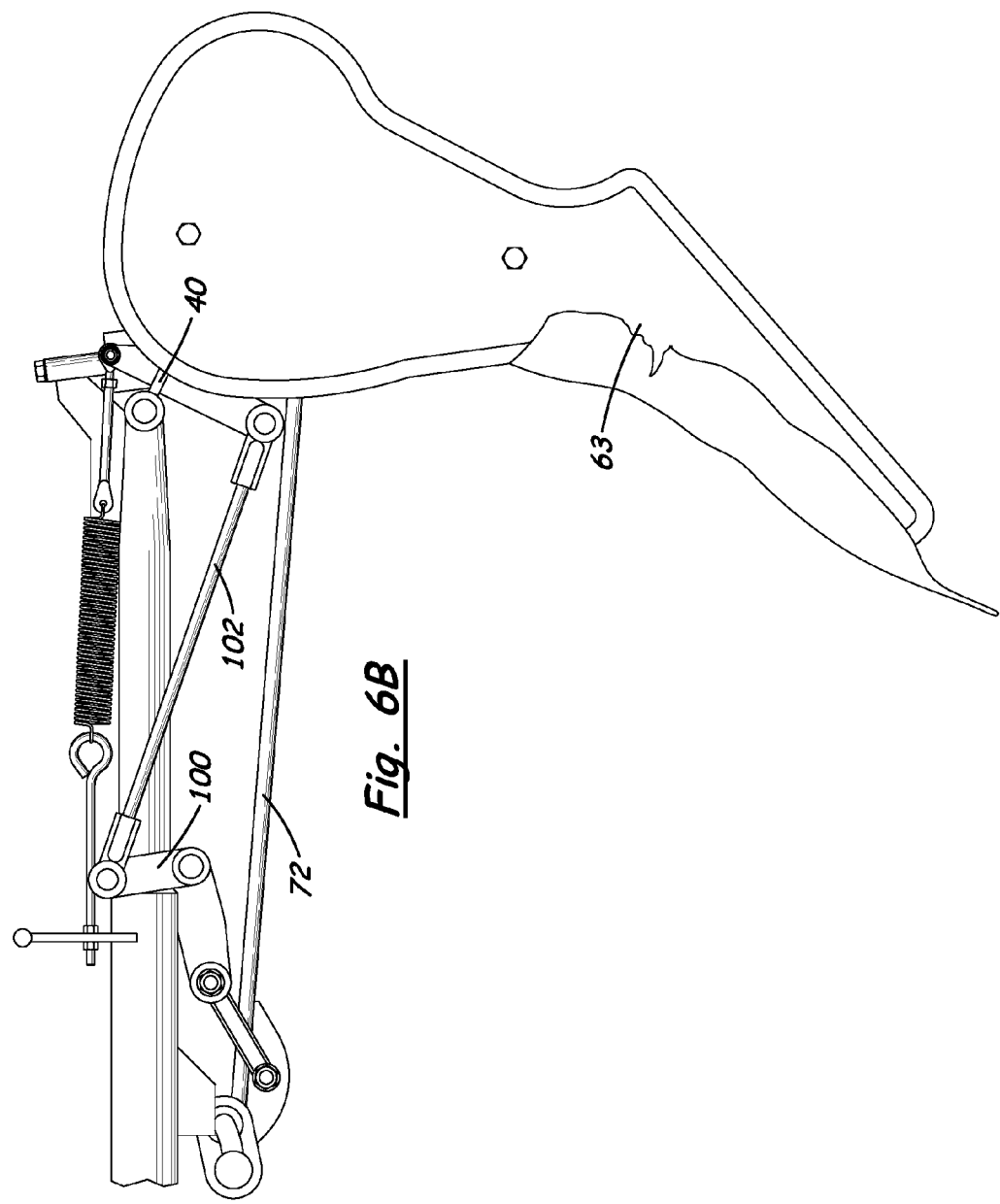
FIG. 6B is a schematic left side view of the steer assembly, according to an illustrative embodiment, shown with the leg structure at the substantially forwardmost position of the gait movement similar to the position of FIG. 6A.
Figure 7A:
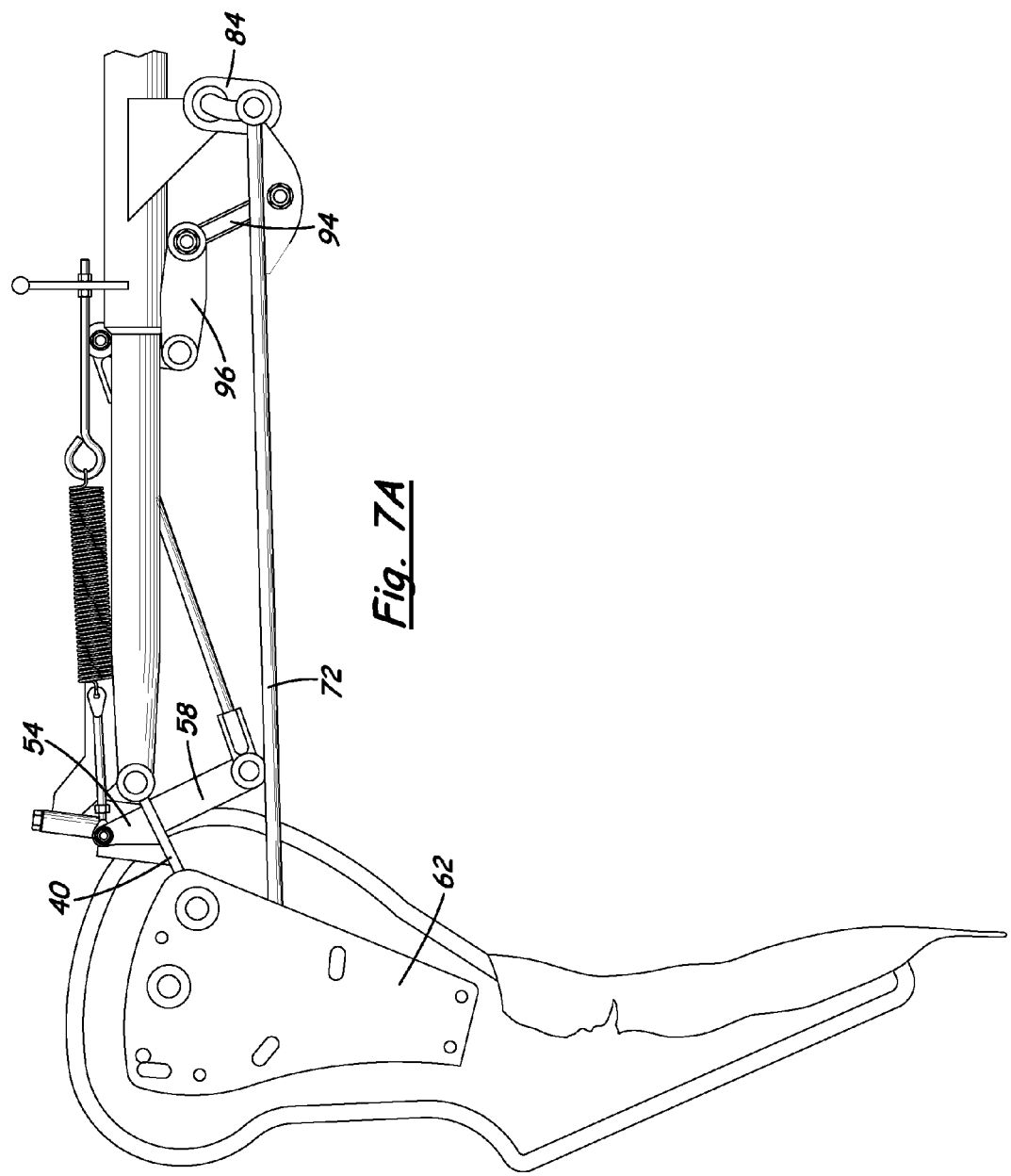
FIG. 7A is a schematic right side view of the steer assembly, according to an illustrative embodiment, shown with the leg structure at a substantially rearward movement portion of the gait movement.
Figure 8:
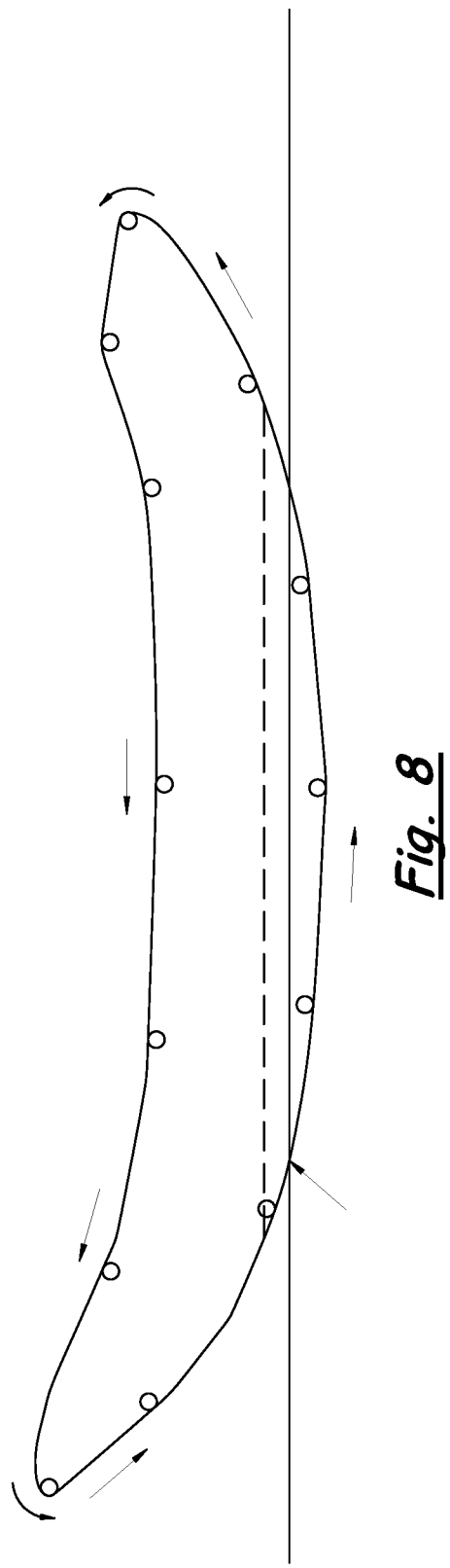
FIG. 8 is a schematic trace diagram of gait movement of the lower end of the leg member with respect to the ground surface.

With reference now to the drawings, and in particular to FIGS. 1 through 8 thereof, a new steer roping practice apparatus with improved leg gait embodying the principles and concepts of the disclosed subject matter will be described.

A mechanical roping steer simulation apparatus is utilized for practicing the roping of a live steer (e.g., in a roping competition) without using a live steer. The use of such simulators can be highly advantageous, but the applicant has recognized that while the leg of a live steer contacts the ground surface for a significant portion of the front-to-rear gait movement of the steer's leg while walking or running, known steer simulation apparatus typically move the hoof of the simulated steer leg in a simple arc, which usually results in the hoof only briefly touching the ground surface or touching the ground surface for only a small portion of the front to rear movement of the leg. The applicant has developed a steer roping apparatus that more accurately simulates the gait of the steer's leg to maintain the leg in contact with, or in close proximity to, the ground surface, making roping of the leg or legs more realistic and typically more difficult than simulation in which the leg only briefly touches the ground surface or for only a small portion of the front to rear movement of the leg In one aspect, the disclosure is directed to a mechanical roping steer apparatus 10 that is advantageous for practicing steer roping with a simulation that is highly comparable to a live steer. In general, the apparatus 10 may include a support assembly 12 for resting on a ground surface as well as a rotatable wheel 24 for engaging the ground surface, and a steer assembly 26 connected to the support assembly 12 for movement relative to the ground surface and generally in concert with the support assembly and the wheel.

In greater detail, the support assembly 12 may be positioned towards the front of the apparatus 10, and the support assembly may have a front 14 and a rear 15. The support assembly may also include a structure for connecting the support assembly to a towing vehicle (or even an animal) to facilitate towing of the apparatus 10 across the ground surface behind the vehicle (such as an all-terrain vehicle). The towing structure may include, for example, a tow bar, a tow rope or cord, or any other suitable means for connecting the support assembly to the vehicle. The support assembly 12 may include a base portion 16 and a pair of lateral skid portions 18, 19 for contacting the ground surface, and the lateral skid portions may extend laterally from opposite sides of the base portion 16. Each of the lateral portions may comprise a skid member 20 extending generally forwardly and rearwardly with respect to the support assembly, and may also include at least one lateral member 22 extending laterally from the base portion to the skid member. Each lateral member 22, 23 may extend downwardly from the base portion 16 to the respective lateral skid portion to raise the base portion above the skid member and above the ground surface.

The rotatable wheel 24 may be positioned rearwardly of the support assembly and may be mounted on the support assembly (or optionally the steer assembly 26) in a manner such that the wheel 24 contacts the ground surface, and also such that movement of the support assembly across the ground surface in a forward direction tends to cause the wheel to rotate due to the frictional contact between the wheel and the ground surface.

The steer assembly 26 may be located rearwardly of the support assembly and may be mounted on the rear of the support assembly. The steer assembly may include a frame 28 which includes a forward frame portion 30 and a rearward frame portion 32 with the forward frame portion being mounted on the support assembly. In some embodiments, the rearward frame portion 32 may include a spine structure 34 which may be elongated and extend in a generally longitudinal direction of the steer assembly 26. The spine structure may have a front 36 and a rear 37. The spine structure 34 may have a transversely extending bore located toward the rear 37 of the spine structure.

The steer assembly 26 may include a hip structure 40 which is movable with respect to the frame 28. The hip structure 40 may be movable between a first position (see FIGS. 4A and 4B) and a second position (see FIGS. 5A and 5B). The first position may be characterized as a raised position relative to the second position, and may also be characterized as a rearward position relative to the second position. The second position may be characterized as a lowered position relative to the first position, and may also be characterized as a forward position relative to the first position. The hip structure 40 may be positioned rearwardly of the spine structure 34 and may be movable with respect to the spine structure. The hip structure 40 may be mounted on the spine structure to permit movement therebetween, such as pivotal movement, and may be mounted on the rear of the spine structure. Generally, the hip structure may have a forward end 42 and a rearward end 43.

In greater detail, the hip structure 40 may include a central portion 44 which may extend generally between the forward 42 and rearward 43 ends of the hip structure. The hip structure may also include a forward mounting element 46 which is located toward the forward end of the hip structure and may be connected to the central portion 44 at the forward end. In some embodiments, the forward mounting element 46 may comprise a pair of laterally spaced forward bushings 48, and a hip mounting rod 49 may extend through the forward bushings 48 and through the transversely-extending bore of the spine structure 34 to connect the hip structure to the spine structure. Further, the hip structure may include a rearward mounting element 50 located toward the rearward end of the hip structure. The rearward mounting element 50 may be connected to the central portion at the rearward end, and the rearward mounting element may comprise a pair of laterally spaced rearward bushings 52.

The hip structure 40 may also include an intermediate mounting element 54 located between the forward and rearward ends of the hip structure, and mounting element 54 may be mounted on the central portion 44 of the hip structure. The intermediate mounting element 54 may extend upwardly from the central portion. In some embodiments, the intermediate mounting element 54 may include a pair of laterally spaced tabs 56. The hip structure 40 may also include an intermediate connector element 58 which is located between the forward and rearward ends of the hip structure, and may be mounted on the central portion of the hip structure. The intermediate connector element may extend generally downwardly from the central portion.

The steer assembly 26 may also include a leg structure 60 which is movable with respect to the frame 28. The leg structure may be mounted on the hip structure 40 and may be movable with respect to the hip structure. The leg structure 60 may be pivotally mounted on the hip structure at a location of pivot mounting to pivot about a pivot axis 61, such that movement of the hip structure moves the location of pivot movement of the leg structure with respect to the frame. Movement of the hip structure between the first and second positions may move the location of the pivot mounting relatively lower and relatively higher with respect to the frame, and relatively rearward and relatively forward with respect to the frame. Movement of the hip structure 40 may thus affect the relative position of the leg structure as the leg structure pivots to simulate the movement of the leg structure between the forward and rearward gait positions. For example, the movement of the hip structure may change the location of the pivot movement between a first location (see FIGS. 3A and 3B) generally corresponding to the first position of the hip structure, and a second location (see FIGS. 5A and 5B) generally corresponding to the second position of the hip structure. The first location of the leg structure pivot may be relatively higher and further rearward and the second location of the leg structure pivot may be relatively lower and further forward. The location of the pivot movement may move in an arc with respect to the frame. The leg structure 60 may include at least one leg member 62 which is movable with respect to the spine structure. The at least one leg member may have a lower end movable forwardly and rearwardly, and in some embodiments a tip flap 65 may be mounted on and extend from the lower end of the leg member or members. The tip flap 65 may be flexible in character such that when a portion of the tip flap comes into contact with the ground surface, the portion of the tip flap may be deflected or bent by the contact until the tip flap no longer contacts the ground surface. The at least one leg member may comprise a pair of laterally spaced leg members 62, 63, and in some embodiments at least a portion of the hip structure 40 may be located between the leg members 62, 63. A leg mounting rod 64 may extend through the at least one leg member and through the pair of laterally spaced rearward bushings of the rearward mounting element 50 to thereby mount the leg member or members on the hip structure. The axis of the leg mounting rod may generally correspond to the pivot axis 61 of the leg structure.

The steer assembly 26 may also include an actuation assembly 66 which may be configured to move the hip structure 40 and the leg structure 60 such that the leg structure engages the ground surface below the steer assembly and moves the leg member or members when the steer assembly is moved across the ground surface. The actuation assembly causes the hip structure and leg structure to move as a result of the movement of the apparatus across the ground surface.

The actuation assembly 66 may be configured to move the leg member or members of the leg structure downwardly toward the ground surface during rearward movement of the leg member, and may be configured to move the leg member of the leg structure upwardly during forward movement of the member. In some embodiments, the actuation assembly 66 may be configured to move the hip structure 40 and the leg structure 60 downwardly toward the ground surface during rearward movement of the leg member, and may be configured to move the hip structure and the leg structure upwardly during forward movement of the leg member. Further, the actuation assembly may be configured to move the location of the pivot axis of the leg structure toward the ground surface during rearward movement of the leg member, and may move the location of the pivot axis away from the ground surface during forward movement of the at least one leg member. Illustratively, the actuation assembly may be configured to move the hip structure toward the first position during forward movement of the leg member and may move the hip structure toward the second position during rearward movement of the leg member.

The actuation assembly 66 may convert the rotational motion of the wheel to translational and pivot movement. The actuation assembly 66 may cause a correspondence between the speed of movement of the apparatus 10 over the ground surface and the speed of movement of the hip and leg structures such that faster movement across the ground surface causes faster movement of the hip and leg structures and slower movement across the ground surface results in slower movement of the hip and leg structures.

The actuation assembly 66 may comprise a leg actuation assembly 68 for transmitting and translating the (rotational) movement of the wheel to (reciprocating) movement of the leg structure. The leg actuation assembly 68 may comprise a leg linkage 70 which may connect the rotatable wheel to the leg structure such that rotation of the wheel by the ground surface is transferred to the leg structure to pivot the at least one leg member. The leg linkage 70 may include a transfer member 72 which is configured to reciprocate in a generally forward and rearward manner by the rotation of the wheel, although the transfer member may simultaneously move upwardly and downwardly to a typically lesser degree than the forward and rearward movement. Thus, the forward-rearward movement of the transfer member may not be a purely translational movement, but may include a degree of movement in other directions.

The transfer member 72 may be connected to the wheel and to the leg structure to move the leg structure. The transfer member may have a forward end 74 and a rearward end 75, and may have a mount point 76 which may be located between the forward and rearward ends and in some embodiments may be located toward the forward end of the transfer member. Illustratively, the leg linkage 70 may also include a driver pulley 78 which is mounted on, or otherwise connected to, the wheel such that the driver pulley rotates in concert with the wheel, and may rotate as a unit with the wheel. The leg linkage 70 may also include a driven pulley 80 which is rotatably mounted on the frame, and a belt 82 which connects the driver pulley to the driven pulley such that rotation of the driver pulley is transferred to the driven pulley. The leg linkage 70 may also include a first offset arm 84 which is connected to the driven pulley to rotate with the driven pulley. In some embodiments, the driven pulley 80 and the first offset arm 84 may be mounted on a common rotating shaft with at least a portion of the first offset arm 84 extending radially from the shaft to provide a mounting point that rotates along a generally circular path. The first offset arm 84 may thus be completely rotated by the rotation of the wheel.

The transfer member 72 may be connected to the first offset arm 84 and may also be connected to the leg structure. The transfer member may be rotatably connected to the offset arm 84 and rotatably connected to the leg member 62. Illustratively, the forward end 74 of the transfer member may be connected to the offset arm and the rearward end 75 of the transfer member may be connected to the at least one leg member. The forward end 74 may be connected to the mounting point on the offset arm 84 which is radially offset from the axis of rotation of the arm 84 such that the forward end is moved in a substantially circular path by the rotation of the wheel. The rearward end of the transfer member may be mounted to the leg member 62 at a location that is separated or offset from the pivot mount and the pivot axis 61 of the leg structure such that the forward and rearward translational movement of the transfer member generally causes pivot movement of the leg structure in a reciprocating manner. The movement of the transfer member may move the mount point 76 on the transfer member forwardly and rearwardly as well as upwardly and downwardly.

The actuation assembly 66 may also include a hip actuation assembly 90 which connects the rotatable wheel 24 to the hip structure 40 such that rotation of the wheel by contact with the ground surface is transferred to the hip structure to thereby pivot the hip structure, generally between the first and second positions of the hip structure. The hip actuation assembly 90 may comprise a hip linkage 92 which may include a first connector member 94 connected to the transfer member 72 and may be pivotally mounted on the transfer member, such as at the mount point 76. The hip linkage 92 may also include a first rocker arm 96 which is connected to the first connector member 94 such that movement of the first connector member causes movement of the first rocker arm. The first rocker arm may be pivotally connected to the first connector member, and movement of the first connector member may cause pivotable and reciprocating movement of the rocker arm 96 as well as the first connector member. The hip linkage 92 may also include a hip movement rod 98 which may be rotatably mounted on the frame 28, such as on the spine structure 34, and may be connected to the first rocker arm 96 such that pivoting of the first rocker arm rotates the hip movement rod 98 for at least a partial rotation of the rod 98. The hip linkage 92 may also include a second rocker arm 100 which is connected to the hip movement rod 98 such that the second rocker arm moves with the hip movement rod (and in turn the first rocker arm). Thus, in some embodiments, the first rocker arm 96, the hip movement rod 98, and the second rocker arm 100 move as a unit about an axis generally corresponding to the central longitudinal axis of the hip movement rod. The hip linkage 92 may also include a second connector member 102 which is connected to the second rocker arm 100 and the hip structure 40 to transfer movement of the second rocker arm to the hip structure. The second connector member 102 may be pivotally connected to the second rocker member, and may also be pivotally connected to the intermediate connector element 58 of the hip structure. In general, the second connector member 102 may move forwardly and rearwardly, The actuation assembly 66 may also include a hip biasing assembly 104 which is configured to bias the hip structure 40 toward the first position of the structure 40, or generally toward the relatively raised position. The hip biasing assembly 104 may include a bias mount 106 which may be mounted on the frame and may be located on the spine structure 34. The bias mount may extend generally upwardly from the spine structure. The hip biasing assembly 104 may also include at least one biasing element 108 which may be mounted on the frame 28 and also mounted on the hip structure 40 for biasing the hip structure toward the first position. The biasing element 108 may be connected to the bias mount 106 and to the intermediate mounting element 54. The at least one biasing element may comprise a tension spring, and in some embodiments the at least one biasing element comprises a pair of biasing elements or springs acting in concert with each other. The hip biasing assembly 104 may also include a hip stop 110 which is mounted on the frame and may be configured to restrict movement of the hip structure with respect to the frame. The hip stop 110 may be mounted on the spine and may extend generally rearwardly from the spine structure such that the hip stop 110 contacts the hip structure 40 in the first position of the hip structure to thereby set the raised position. The hip stop 110 may be adjustable to thereby adjust the raised position of the hip structure with respect to the frame.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A mechanical roping steer apparatus for practicing roping of a steer, the apparatus comprising:
    a rotatable wheel configured to contact the ground surface such that movement of the wheel across the ground rotates the wheel;
    a steer assembly comprising:
        a frame having a front and a rear, the wheel being rotatably connected to the frame;
        a hip structure movably mounted on the frame to move between a first position and a second position, the hip structure having a forward end mounted on the frame and a rearward end;
        a leg structure movably mounted on the hip structure to move between a forward position and a rearward position, the leg structure including at least one leg member extending downwardly with respect to the hip structure; and
        an actuation assembly configured to move the at least one leg member downwardly toward the ground surface during rearward movement of the at least one leg member;
        wherein movement of the leg structure causes movement of a lower end of the at least one leg member along a path defined by a perimeter of a substantially crescent shape.

2. The apparatus of claim 1 wherein the actuation assembly is configured to move the hip structure and the leg structure downwardly toward the ground surface during rearward movement of the at least one leg member and move the hip structure and the leg structure upwardly during forward movement of the at least one leg member.

3. The apparatus of claim 1 wherein the leg structure pivots with respect to the hip structure about a pivot axis, and the actuation assembly is configured to move a location of the pivot axis toward the ground surface during rearward movement of the at least one leg member and to move the location of the pivot axis away from the ground surface during forward movement of the at least one leg member.

4. The apparatus of claim 1 wherein the hip structure is pivotally mounted on the frame to pivot with respect to the frame, and wherein the actuation assembly is configured to pivot the hip structure upwardly toward the first position during forward movement of the at least one leg member and pivot the hip structure downwardly toward the second position during rearward movement of the at least one leg member.

5. The apparatus of claim 4 wherein the leg structure is pivotally mounted on the hip structure to pivot about a pivot axis, and wherein pivot movement of the hip structure with respect to the frame pivots a location of the pivot axis of the leg structure along an arcuate path.

6. The apparatus of claim 1 wherein the hip structure is configured to reciprocate upwardly and downwardly with respect to the frame along an arcuate path and the leg structure is configured to reciprocate forwardly and rearwardly with respect to the hip structure along an arcuate path.

7. The apparatus of claim 1 wherein the first position of the hip structure is relatively lower toward the ground surface than the second position of the hip structure.

8. The apparatus of claim 1 wherein the first position of the hip structure is relatively rearward and the second position of the hip structure is relatively forward.

9. The apparatus of claim 1 wherein a hip structure is pivotally mounted on the spine structure and the leg structure is pivotally mounted on the hip structure to permit articulation of the structures.

10. The apparatus of claim 1 additionally comprising a support assembly for resting on a ground surface; and
wherein the support assembly includes a base portion and a pair of lateral skid portions for contacting the ground surface, the lateral skid portions extending laterally from the base portion.

11. The apparatus of claim 1 additionally comprising a hip biasing assembly configured to bias the hip structure toward the first position.

12. The apparatus of claim 1 wherein the actuation assembly includes a hip actuation assembly configured to move the hip structure and a leg actuation assembly configured to move the leg structure.

13. The apparatus of claim 1 wherein the actuation assembly is configured to move the leg structure and the hip structure in a manner that corresponds to a speed of movement of the steer assembly over the ground surface.

14. A mechanical roping steer apparatus for practicing roping of a steer, the apparatus comprising:
a rotatable wheel configured to contact the ground surface such that movement of the wheel across the ground rotates the wheel;
a steer assembly comprising:
a frame having a front and a rear, the wheel being rotatably connected to the frame;
a hip structure movably mounted on the frame to move between a first position and a second position, the hip structure having a forward end mounted on the frame and a rearward end;
a leg structure movably mounted on the hip structure to move between a forward position and a rearward position, the leg structure including at least one leg member extending downwardly with respect to the hip structure; and
an actuation assembly configured to cause movement of a lower end of the at least one leg member along a path defined by a perimeter of a substantially crescent shape.

15. The apparatus of claim 14 wherein the actuation assembly is configured to move the at least one leg member downwardly toward the ground surface during rearward movement of the at least one leg member.

16. The apparatus of claim 15 wherein the actuation assembly is configured to move the at least one leg member upwardly during forward movement of the at least one leg member.

* * * * *